United States Patent [19]

Ihbe et al.

[11] Patent Number: 4,505,592
[45] Date of Patent: Mar. 19, 1985

[54] APPARATUS FOR PRODUCING A MIXTURE FROM TWO OR MORE PLASTIC COMPONENTS

[75] Inventors: Jörg Ihbe, Gauting; Peter Taubenmann, Munich; Heino Thiele, Ludwigshafen; Hans-Dieter Zettler, Gruenstadt, all of Fed. Rep. of Germany

[73] Assignee: BASF Aktiengesellschaft, Ludwigshafen, Fed. Rep. of Germany

[21] Appl. No.: 547,998

[22] Filed: Nov. 2, 1983

[30] Foreign Application Priority Data

Nov. 16, 1982 [DE] Fed. Rep. of Germany ....... 3242278

[51] Int. Cl.³ .............................................. B01F 5/04
[52] U.S. Cl. .................................. 366/134; 366/176;
366/341; 422/133; 137/625.4; 137/563
[58] Field of Search .................. 366/134, 136, 137;
422/133, 132; 137/625.4, 563

[56] References Cited

U.S. PATENT DOCUMENTS

| 862,130 | 8/1907 | Bonte | 137/625.4 |
|---|---|---|---|
| 2,233,871 | 3/1941 | Parsons | 137/625.4 |
| 3,512,542 | 5/1970 | Hansen | 137/563 X |
| 3,630,230 | 12/1971 | Stahle | 137/625.4 |
| 3,706,515 | 12/1972 | Keuerleber et al. | 425/4 |
| 4,226,543 | 10/1980 | Schlüter | 422/133 X |
| 4,314,963 | 2/1982 | Boden et al. | 422/133 X |
| 4,344,919 | 8/1982 | Kelterbaum | 422/133 |
| 4,348,116 | 9/1982 | Bordas | 366/134 X |
| 4,379,122 | 4/1983 | Taubenmann | 366/137 X |

FOREIGN PATENT DOCUMENTS 77266 7/1978 Japan ................... 422/133

Primary Examiner—Philip R. Coe
Assistant Examiner—Frankie L. Stinson
Attorney, Agent, or Firm—Keil & Weinkauf

[57] ABSTRACT

A mixing apparatus for multi-component plastics, in particular polyurethane, possesses a mixing chamber (2) with inlet apertures (3) and (4) for the individual plastic components and an outlet aperture (8) for the mixture. In the mixing chamber, a control element (5), which has the same cross-section as the chamber and possesses overflow channels (6) and (7), can be moved to and fro for controlling the component streams. In order to avoid pressure peaks or pressure surges in the transport of the components when the control element passes from the closed position to the mixing position and vice versa, and to provide improved accuracy of metering, the inlet apertures in the inner wall of the mixing chamber, and the corresponding areas of the shell of the control element between its end face (13) and the overflow channels, are matched with one another with regard to their size.

5 Claims, 2 Drawing Figures

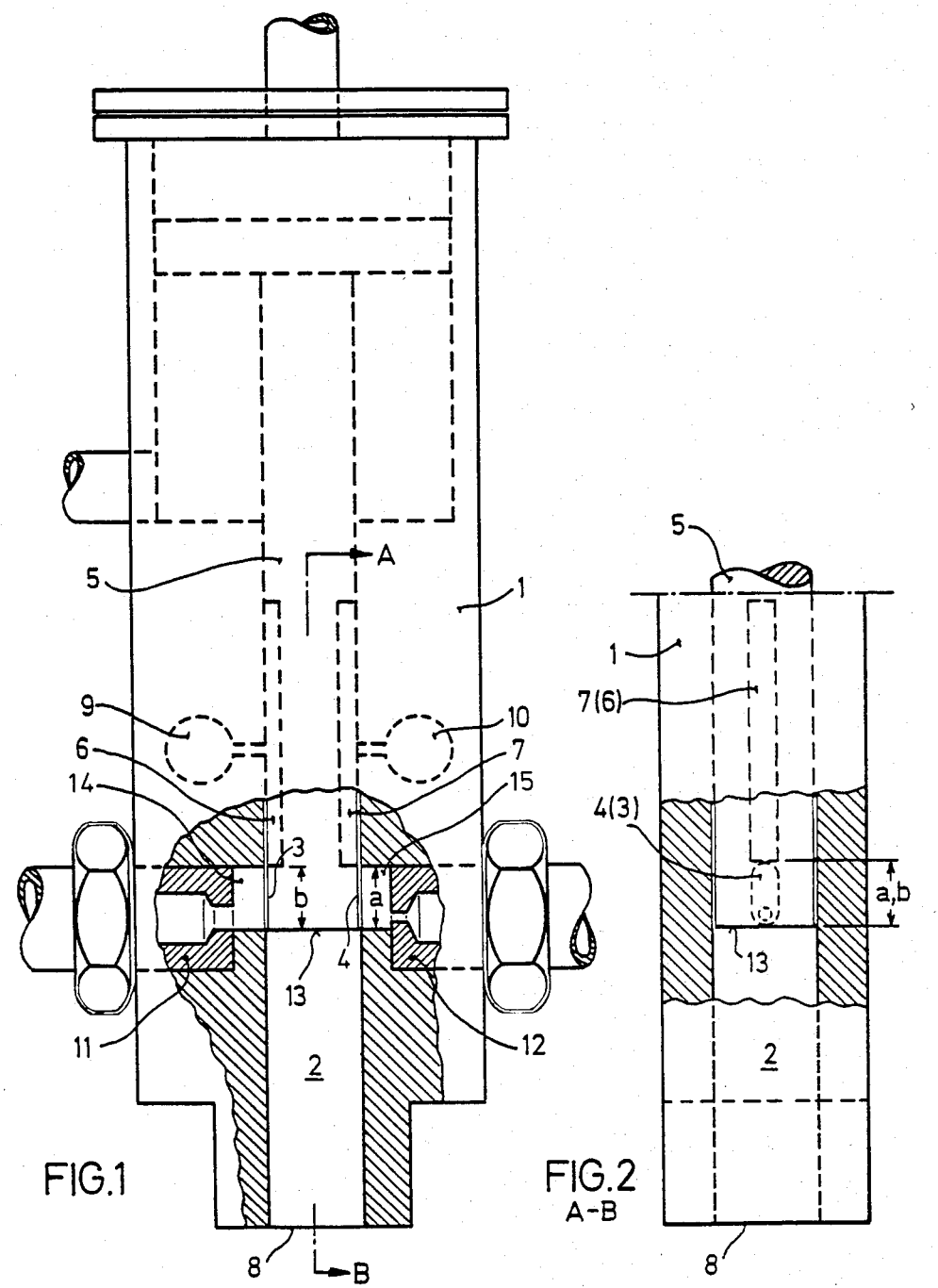

APPARATUS FOR PRODUCING A MIXTURE FROM TWO OR MORE PLASTIC COMPONENTS

The present invention relates to an apparatus for producing a mixture, which is preferably chemically reactive, from two or more plastic components.

In a conventional mixing apparatus of this type (German Published Application DAS No. 2,007,935), the inlet apertures for the individual plastic components open and close alternately and simultaneously without it being necessary to provide special control means for the opening and closing, since, in executing the to-and-fro movement, the control element passes over each of the inlet apertures. The control element possesses packing surfaces which extend over the inlet apertures. When the control element passes over the inlet apertures, these are completely closed by the packing surfaces for a certain time, before the plastic components can enter either the mixing chamber or the overflow channels. During this time interval when the inlet apertures are completely closed, the pressure existing between the continuously conveying metering pumps and the injection nozzles increases. However, deviations from the pressure which is found to be the optimum working pressure in the metering system have adverse effects on the mixing result. Particularly at the beginning of a mixing process, relatively high flow velocities of the plastic components result in varying mixing ratios and hence poorer product quality. In order to keep this reduction in quality to a minimum, the control element has to move at very high speeds; however, this can be achieved only by means of a method which is particularly complicated technically.

It is an object of the present invention to employ simple means to prevent a change in the flow velocities of the plastic components during an injection cycle and at the same time to increase the accuracy of metering in a mixing apparatus of the above type, by retaining the method of recycling the components, which is simple both constructionally and from the point of view of control engineering.

We have found that this object is achieved by the measure proposed in the characterizing clause of claim 1.

The flow velocities of the plastic components are kept constant according to the invention by the following means: the inlet apertures in the inner wall of the mixing chamber housing and the corresponding areas of the shell of the control element are matched in size, ie. the inlet apertures are completely closed only for a single position of the control element. As a result, pressure peaks or pressure surges during passage of the control element from the closed position to the mixing position and vice versa are avoided. Moreover, we have also found that the stroke rate of the control element can be substantially reduced, without the mixing result being disadvantageously affected. The hydraulic drive unit for the control element can have a correspondingly low output.

A further feature of the invention is that the inlet apertures are in the form of an elongated hole. This has the advantage that the packing surface formed by the inner wall of the housing and by the shell of the control element can be made sufficiently large.

The example which follows illustrates the invention, with reference to the drawing.

FIG. 1 shows a side view of the apparatus according to the invention, partly cut away, and FIG. 2 shows a longitudinal section through a part of the apparatus, along line A—B of FIG. 1.

The apparatus for mixing two plastic components essentially consists of a housing (1), in which a mixing chamber (2) is formed. Inlet apertures (3) and (4) lead into the mixing chamber, which is generally cylindrical. (5) denotes a control element which can move to and fro in the mixing chamber to control the inflow of the plastic components and at the same time to clean the mixing chamber. The control element with overflow channels (6) and (7) is shown in its closed position in the drawing; it is operated by means of a hydraulic piston/cylinder unit, and can be driven as far as the area of the outlet aperture (8) of the mixing chamber. In this recirculation position, the plastic components do not come into contact with one another but are recycled to storage containers via the overflow channels and through apertures (9) and (10).

Each inlet aperture (3) or (4) contains an injection nozzle (11) or (12). The inlet apertures are in the form of an elongated hole, and the injection nozzles are preferably located displaced in the direction of the outlet aperture (8) of the mixing chamber (2). In the closed position of the control element (5), the inlet apertures are completely covered by the shell of the control element (FIG. 1) and gaps (14) and (15) result between the injection nozzles and the control element. The axial extension of the region (b) of the shell of the control element between its end face (13), which faces the outlet aperture of the mixing chamber, and the lower end of the overflow channels (6) and (7) exactly matches the corresponding dimensions (a) of the inlet apertures. In this manner, pressure peaks which build up in the component lines when the packing surface of the control element passes over the inlet openings are prevented. As a result, disturbance of the mixing ratio at the beginning of the metering process can be effectively avoided.

We claim:

1. An improved apparatus for producing a mixture from at least two plastic components, said apparatus including a mixing chamber having inlet apertures for the individual plastic components, an outlet for the mixture, recycle lines for each of said plastic components and a control element reciprocable in the mixing chamber across the inlet apertures, said control element having overflow channels to connect said apertures to said recycle lines when said apertures are blocked from said mixing chamber, said improvement comprising:
   an end portion of said control element extending beyond said overflow channels in the direction of reciprocation and having a length matching the dimension of said inlet apertures measured in the said direction of reciprocation, said end portion having a cross section conforming to the cross section of said mixing chamber, whereby to momentarily cover said apertures and prevent pressure peaks in the plastic components when said control element reciprocates across said apertures.

2. Apparatus as claimed in claim 1, wherein the inlet apertures are in the form of an elongated hole.

3. The apparatus of claim 1, wherein each aperture contains an injection nozzle for one plastic component.

4. The apparatus of claim 1, wherein a gap exists between each aperture and respective injection nozzle.

5. The apparatus of claim 4, wherein the apertures are of equal dimensions and the respective nozzles are of differing dimensions related to the ratio of said plastic components in said mixture.

* * * * *